United States Patent
Gan et al.

(10) Patent No.: US 10,865,982 B2
(45) Date of Patent: Dec. 15, 2020

(54) MINIATURE LIQUID COMBUSTOR HAVING DOUBLE PRE-HEATING STRUCTURE, AND COMBUSTION METHOD THEREOF

(71) Applicant: South China University of Technology, Guangzhou (CN)

(72) Inventors: Yunhua Gan, Guangzhou (CN); Zhengwei Jiang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 242 days.

(21) Appl. No.: 16/085,816

(22) PCT Filed: Dec. 9, 2016

(86) PCT No.: PCT/CN2016/109188
§ 371 (c)(1),
(2) Date: Dec. 17, 2018

(87) PCT Pub. No.: WO2017/157059
PCT Pub. Date: Sep. 21, 2017

(65) Prior Publication Data
US 2019/0113227 A1    Apr. 18, 2019

(30) Foreign Application Priority Data

Mar. 17, 2016  (CN) .......................... 2016 1 0153998

(51) Int. Cl.
*F23C 7/06*    (2006.01)
*F23D 11/44*    (2006.01)
(Continued)

(52) U.S. Cl.
CPC ................. *F23D 11/44* (2013.01); *F23C 7/06* (2013.01); *F23D 11/40* (2013.01); *F23D 11/406* (2013.01);
(Continued)

(58) Field of Classification Search
CPC ........ F23D 11/44; F23D 11/40; F23D 11/406; F23D 2900/21; F23C 7/06
(Continued)

(56) References Cited

U.S. PATENT DOCUMENTS 2,252,631 A * 8/1941 Hirter ................... F24H 9/0052
126/106
4,255,122 A * 3/1981 Alpkvist ................... F23C 7/06
431/215
(Continued)

FOREIGN PATENT DOCUMENTS

CN    101975397 A    2/2011
CN    102447122 A    5/2012
(Continued)

OTHER PUBLICATIONS

CN105066127 English Abstract, Nov. 18, 2015.
(Continued)

*Primary Examiner* — Avinash A Savani
(74) *Attorney, Agent, or Firm* — Fishman Stewart PLLC

(57) ABSTRACT

A miniature liquid combustor includes a double pre-heating structure. A method of operating the combustor comprises introducing liquid hydrocarbon fuel and air into a combustion chamber and stably combusting above a metal catalytic grid. The flames of the combustor first heating a third sleeve, the heated third sleeve gradually radiating the thermal energy to first and second fuel pre-heating chambers until the entire miniature liquid combustor is heated. The process continues to respectively implement second pre-heating of air introduced into the air pre-heating chambers and fuel introduced into the fuel pre-heating chambers before introducing them into the combustion chamber. The resulting combustor and combustion method enable double counter-flow pre-heating of air and fuel before being introduced into the combustion chamber, such that the air and the fuel are fully preheated before combustion.

10 Claims, 5 Drawing Sheets

(51) Int. Cl.
*H01M 8/00* (2016.01)
*F23D 11/40* (2006.01)

(52) U.S. Cl.
CPC ............ *F23D 11/443* (2013.01); *H01M 8/00* (2013.01); *F23D 2900/21* (2013.01); *Y02E 20/34* (2013.01)

(58) Field of Classification Search
USPC .................................. 431/215, 11; 126/106
See application file for complete search history.

(56) References Cited

U.S. PATENT DOCUMENTS

| | | | |
|---|---|---|---|
| 4,318,689 A | | 3/1982 | Forster et al. |
| 4,849,187 A | * | 7/1989 | Uozu ..................... B01J 8/0278 422/629 |
| 4,867,572 A | * | 9/1989 | Brock ................. E01C 19/1036 366/25 |
| 5,188,042 A | * | 2/1993 | Lauwers ................. F23D 17/00 110/238 |
| 5,233,933 A | * | 8/1993 | McSorley ................ F23G 5/16 110/246 |

FOREIGN PATENT DOCUMENTS

| | | |
|---|---|---|
| CN | 104235839 A | 12/2014 |
| CN | 104595899 A | 5/2015 |
| CN | 104728838 A | 6/2015 |
| CN | 105066127 A | 11/2015 |
| CN | 105674260 A | 6/2016 |
| CN | 205717189 U | 11/2016 |
| EP | 0601270 B1 | 3/1997 |
| JP | H08327013 A | 12/1996 |
| JP | 2005076973 A | 3/2005 |
| JP | 2007093179 A | 4/2007 |
| WO | 9908296 A2 | 2/1999 |

OTHER PUBLICATIONS

CN104595899 English Abstract, May 6, 2015.
CN104728838 English Abstract, Jun. 24, 2015.
JP2005076973 English Abstract, Mar. 24, 2005.
Chinese International Search Report—CN201610153998.8, Mar. 17, 2016.
CN101975397 English Abstract, Feb. 16, 2011.
CN102447122 English Abstract, May 9, 2012.
CN104235839 English Abstract, Dec. 24, 2014.
CN105674260 English Abstract, Jun. 15, 2016.
CN205717189 English Abstract, Nov. 23, 2016.
JP2007093179 English Abstract, Apr. 12, 2007.
JPH08327013 English Abstract, Dec. 10, 1996.

\* cited by examiner

MINIATURE LIQUID COMBUSTOR HAVING DOUBLE PRE-HEATING STRUCTURE, AND COMBUSTION METHOD THEREOF

CROSS-REFERENCE TO RELATED APPLICATIONS

This application claims priority to China Patent Application No. CN201610153998.8, filed Mar. 17, 2016, and International Patent Application No. PCT/CN2016/109188, filed Dec. 9, 2016, both of which are hereby incorporated by reference in their entirety.

TECHNICAL FIELD

The present disclosure relates to combustion apparatuses, and in particular, to a miniature liquid combustor having a double pre-heating structure and a combustion method thereof.

BACKGROUND OF THE DISCLOSURE

In the past two decades, as science and technology develop, there is a rapid increase in requirements for miniature electronic instruments and devices in various fields of society, which greatly promotes research by scientific workers on miniature energy systems. So far, most miniature power devices are usually powered by conventional chemical batteries. However, chemical batteries have obvious disadvantages such as a low energy density, a large volume, a heavy weight, a long charging time, and environmental unfriendliness, and as a result gradually fail to satisfy mainstream requirements for social development. The energy density of a liquid hydrocarbon fuel can reach tens of times the energy density of a lithium battery commonly used at present. Therefore, it becomes possible to make a miniature power system that takes a hydrocarbon fuel as an energy source, and it becomes easy to increase the degree of integration of a microelectromechanical system. Moreover, liquid hydrocarbon fuel does not cause pollution, and the environmental pressure on the modern society is greatly relieved. Therefore, miniature energy systems based on liquid hydrocarbon fuels have bright application prospects in the future. A miniature combustor is the core of a miniature energy system, therefore, it is always a research focus to design a miniature combustor having excellent performance.

Different from a conventional combustion process, effective combustion space in a miniature-size combustion process is very limited. As a result, an area-volume ratio in the miniature-size combustion process is tens of times larger than that of a conventional combustor. Therefore, the miniature-size combustion process has a greatly increased thermal loss. Next, size reduction leads to a shortened time that the fuel and air stay in a combustor, resulting in incomplete combustion of the fuel, and the combustion process may fail to be organized. Therefore, it is a current research focus to implement stable combustion and improve combustion efficiency in a miniature size. However, at present, the gas fuel is used in most applied miniature combustors. The energy density of the gas fuel is lower than that of the liquid fuel, and it is inconvenient to store and transport the gas fuel. A miniature combustor that uses liquid hydrocarbon as a fuel has particular advantages. However, the liquid fuel requires additional time and space for evaporation and mixing. It is therefore more challenging to design the structure of a liquid fuel combustor than to design the structure of a gas fuel combustor. Therefore, a miniature combustor for liquid combustion would be helpful. Such a miniature combustor is expected to satisfy both the major requirements for desirable evaporation of the liquid fuel and thorough mixing of the liquid fuel and air.

Technical Challenge

The objective of the present disclosure is to overcome the foregoing disadvantages and deficiency in the prior art, and to provide a miniature liquid combustor having a double pre-heating structure and a combustion method thereof, so as to resolve persistent technical difficulties such as being difficult to evaporate, incomplete and unstable combustion, low combustion efficiency, and easy extinguishment of liquid fuels in existing miniature combustors.

A SOLUTION

Figure 1:
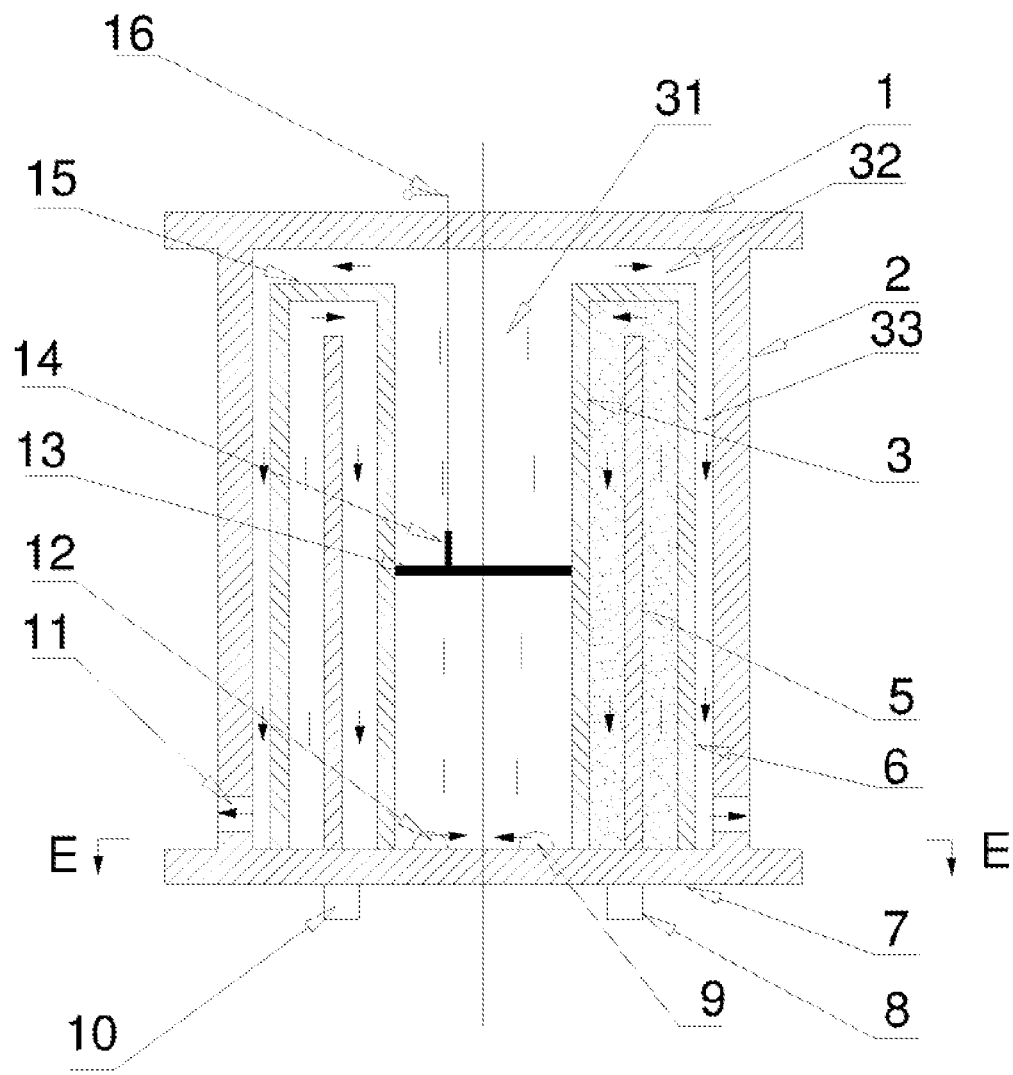
FIG. 1 is a schematic sectional view of an exemplary miniature liquid combustor having a double pre-heating structure in a direction D-D in FIG. 2 according to the present disclosure.

The present disclosure may be implemented by using the following exemplary technical solutions. It will be appreciated and contemplated that other solutions are covered by this disclosure.

A miniature liquid combustor includes a double pre-heating structure comprises: a combustor outer drum body 2, an upper sealing plate 1 used to seal an upper end of the combustor outer drum body 2, and a lower sealing plate 7 used to seal a lower end of the combustor outer drum body, a main vent hole 11 being opened on a sidewall of the lower end of the combustor outer drum body 2.

A first sleeve 6, a second sleeve 5, and a third sleeve 3 may be sequentially comprised inside the combustor outer drum body 2 from outside to inside, lower ends of the first sleeve 6, the second sleeve 5, and the third sleeve 3 are all sealed by the lower sealing plate 7, upper ends of the first sleeve 6 and the third sleeve 3 are both sealed by using a sealing top lid 15, and a gap is provided between an outer surface of the sealing top lid 15 and an inner surface of the upper sealing plate 1, and a gap is provided between a top end of the second sleeve 5 and an inner surface of the sealing top lid 15.

Four partition plates 17 that radially penetrate a sleeve wall of the second sleeve 5 are further disposed on the sleeve wall of the second sleeve, an inner side of each of the partition plates 17 is connected to an inner wall of the third sleeve 3, an outer side of each of the partition plate is connected to an inner wall of the first sleeve 6, an upper side of each of the partition plate is connected to the sealing top lid 15, and a lower side of each of the partition plate is connected to the lower sealing plate 7, and the four partition plates 17 divide the space between the first sleeve 6, the second sleeve 5, and the third sleeve 3 into two opposite and independent air pre-heating chambers and two opposite and independent fuel pre-heating chambers.

Each of the air pre-heating chambers is divided into a first air pre-heating chamber 10-1 and a second air pre-heating chamber 10-2 with the sleeve wall of the second sleeve 5 as a boundary, and the first air pre-heating chamber 10-1 and the second air pre-heating chamber 10-2 are connected through the gap between the top end of the second sleeve 5 and the inner surface of the sealing top lid 15.

Each of the fuel pre-heating chambers is divided into a first fuel pre-heating chamber 8-1 and a second fuel pre-heating chamber 8-2 with the sleeve wall of the second sleeve 5 as a boundary, and the first fuel pre-heating chamber 8-1 and the second fuel pre-heating chamber 8-2 are connected through the gap between the top end of the second sleeve 5 and the inner surface of the sealing top lid 15.

Space in an inner wall surface of the third sleeve 3 is a combustion chamber 31, and space between an outer wall surface of the first sleeve 6 and an inner wall surface of the combustor outer drum body 2 is a vent channel 33, and the combustion chamber 31 and the vent channel 33 are connected through a top-layer loop channel 32 between the outer surface of the sealing top lid 15 and the inner surface of the upper sealing plate 1.

One combustion-chamber air-inlet port 12 is opened respectively, corresponding to the second air pre-heating chambers 10-2 of the two air pre-heating chambers, on a bottom peripheral wall of the third sleeve 3, and one combustion-chamber fuel-inlet port 9 is opened respectively, corresponding to the second fuel pre-heating chambers 8-2 of the two fuel pre-heating chambers, on the bottom peripheral wall of the third sleeve 3.

One air inlet hole 10 is respectively opened, corresponding to the first air pre-heating chambers 10-1 of the two air pre-heating chambers, on the lower sealing plate 7, and one fuel inlet hole 8 is respectively opened, corresponding to the first fuel pre-heating chambers 8-1 of the two fuel pre-heating chambers, on the lower sealing plate 7.

Air sequentially passes through the first air pre-heating chambers 10-1, the second air pre-heating chambers 10-2, and the combustion-chamber air-inlet ports 12 from the air inlet holes 10 to enter the combustion chamber 31, meanwhile, a fuel sequentially passes through the first fuel pre-heating chambers 8-1, the second fuel pre-heating chambers 8-2, and the combustion-chamber fuel-inlet ports 9 from the fuel inlet holes 8 to enter the combustion chamber 31 and is mixed with the air for combustion, and waste gas after combustion passes through the top-layer loop channel 32 and the vent channel 33 to be eventually discharged outside the combustor outer drum body 2 from the main vent hole 11.

The air passes through the air inlet holes 10 to enter the first air pre-heating chambers 10-1 from bottom to top, enter the second air pre-heating chambers 10-2 from top to bottom, enter the combustion chamber 31 from bottom to top, and enter the vent channel 33 from top to bottom, and the fuel enters the first fuel pre-heating chambers 8-1 from bottom to top from the fuel inlet holes 8, enters the second fuel pre-heating chambers 8-2 from top to bottom, enters the combustion chamber 31 from bottom to top, and enters the vent channel 33 from top to bottom.

The combustion-chamber air-inlet ports 12 and the combustion-chamber fuel-inlet ports 9 are both opened in a tangential direction on the same peripheral line of the bottom peripheral wall of the third sleeve 3, and the air and fuel enter the combustion chamber 31 in a tangential manner, are mixed in the combustion chamber 31, and rise spirally.

Positions at which the combustion-chamber air-inlet ports 12 and the air-inlet holes 10 are opened are located on one diameter line, positions at which the combustion-chamber fuel-inlet ports 9 and the fuel-inlet holes 8 are opened are located on another diameter line, and the two diameter lines intersect each other.

Diameters of the air inlet holes 10 and the fuel inlet holes 8 are less than a gap between the second sleeve 5 and the first sleeve 6.

The first fuel pre-heating chambers 8-1 and the second fuel pre-heating chambers 8-2 of the fuel pre-heating chambers are filled with sintered porous material.

A metal catalyst grid 13 is disposed in the middle of the combustion chamber 31, an igniter 14 is placed laterally above the metal catalyst grid 13, and a lead 16 of the igniter 14 passes through the upper sealing plate 1 to be connected to an external high-voltage power source, and a Cu—Ni, Pt—Ni or Pt—Cu catalyst is coated on the surface of the metal catalyst grid 13.

An exemplary combustion method of a miniature liquid combustor according to the present disclosure may operate as follows:

A liquid hydrocarbon fuel and air are introduced into the combustion chamber 31 and are ignited by the igniter 14 to combust stably above the metal catalyst grid 13, combustion flames first heat the third sleeve 3, and the heated third sleeve 3 gradually radiates thermal energy to the first fuel pre-heating chambers 8-1, the second fuel pre-heating chambers 8-2, the first air pre-heating chambers 10-1, and the second air pre-heating chambers 10-2, until the entire miniature liquid combustor is heated, and the air that enters the air pre-heating chambers and the fuel that enters the fuel pre-heating chambers are continuously pre-heated twice respectively before entering the combustion chamber 31. An exemplary process of the double pre-heating may operate as follows:

The liquid hydrocarbon fuel enters the first fuel pre-heating chambers 8-1 from bottom to top from the fuel inlet holes 8 to be heated for the first time, and is crushed for the first time under a crushing effect of the porous material in the first fuel pre-heating chambers 8-1 to form heated liquid drops, and next, the liquid hydrocarbon fuel enters the second fuel pre-heating chambers 8-2 from top to bottom to be heated for the second time, the porous material in the second fuel pre-heating chambers 8-2 heats and crushes for the second time the liquid drops that have been heated and crushed at the first time, to further reduce particle sizes of the heated liquid drops and form fuel vapour, and subsequently the liquid hydrocarbon fuel passes through the combustion-chamber fuel-inlet ports 9 to enter the combustion chamber 31 from bottom to top in a tangential manner.

Air also passes through the air inlet holes 10 to enter the first air pre-heating chambers 10-1 from bottom to top to be heated for the first time, enters the second air pre-heating chambers 10-2 from top to bottom to be heated for the second time, subsequently passes through the combustion-chamber air-inlet ports 12 to enter the combustion chamber 31 in a tangential manner, and is thoroughly mixed with the fuel vapour below the metal catalyst grid 13, to form a gas-liquid mixture, so as to complete double pre-heating and mixing of the liquid hydrocarbon fuel and the air, and next, the mixture rises spirally in a vortex, passes through the metal catalyst grid 13, and combusts stably above the metal catalyst grid, and waste gas after combustion passes through the top-layer loop channel 32 and the vent channel 33 to be eventually discharged outside the combustor outer drum body 2 from the main vent hole 11. The combustion process is completed at the conclusion of this step.

Beneficial Effects of the Present Disclosure

The present disclosure at least has the following advantages and effects:

In the miniature liquid combustor of the present disclosure, the first sleeve 6, the second sleeve 5, and the third sleeve 3 are disposed in the combustor outer drum body 2 in a manner of layered sleeves, and the partition plates 17 are used to beneficially divide the space between the first sleeve 6, the second sleeve 5, and the third sleeve 3 into the two opposite and independent air pre-heating chambers and the two opposite and independent fuel pre-heating chambers. Air and fuel are pre-heated twice in counter-flow before entering the combustion chamber 31, so that the heat exchange intensity is greatly increased, and the air and fuel are thoroughly pre-heated before combustion. Therefore, not only thorough evaporation of a liquid fuel is facilitated to ensure more thorough and stable combustion, but also combustion efficiency is greatly improved. The benefits of partition plates 17 further lie in that this miniature liquid combustor has a more compact and scientific structure.

In the miniature liquid combustor of the present disclosure, porous material is disposed in fuel pre-heating chambers. Under the common effect of high temperature and the porous material, the liquid fuel is further crushed into tinier liquid drops (or fog drops), so that the liquid fuel evaporates more rapidly as the temperature of the liquid fuel gradually rises, thereby making the combustion of the liquid fuel more thorough, stable, and efficient.

In the miniature liquid combustor of the present disclosure, the combustion-chamber air-inlet ports 12 and the combustion-chamber fuel-inlet ports 9 are both opened in a tangential direction on the same peripheral line of the bottom peripheral wall of the third sleeve 3, and the air and fuel enter the combustion chamber 31 in a tangential manner, are mixed in the combustion chamber 31, and rise spirally. Fuel vapour and air that enter in a tangential manner are sucked mutually in cycles in the combustion chamber 31 to be thoroughly mixed, to form a strong and uniform vortex of mixed gas, so that the combustion becomes more stable.

In the miniature liquid combustor of the present disclosure, waste gas after combustion is completed passes through the top-layer loop channel 32 and the vent channel 33 to be eventually discharged outside the combustor outer drum body 2 from the main vent hole 11. In this process, high temperature waste gas that passes through the vent channel 33 is cleverly reused instead of being discarded. In this way, it is equivalent to that an ideal thermal insulation layer is added to the entire combustor, and moreover, the limited structural space of the combustor is utilized in a more desirable manner, so that the performance of the combustor is optimized. In another aspect, such a manner also effectively saves energy.

In the miniature liquid combustor of the present disclosure, a catalyst is coated on the surface of the metal catalyst grid, making it easy to keep combustion flames stable and accelerate chemical reactions, thereby improving the combustion efficiency.

For the miniature liquid combustor of the present disclosure, a miniature structure is implemented, technical measures are simple, the combustion is stable and thorough, the efficiency is high, and extinguishment does not occur easily.

The miniature liquid combustor is especially applicable to a relatively harsh external environment.

Optimal Embodiments of Implementing the Present Disclosure

The present disclosure is further specifically described below in detail with reference to the specific embodiments.

Figure 2:
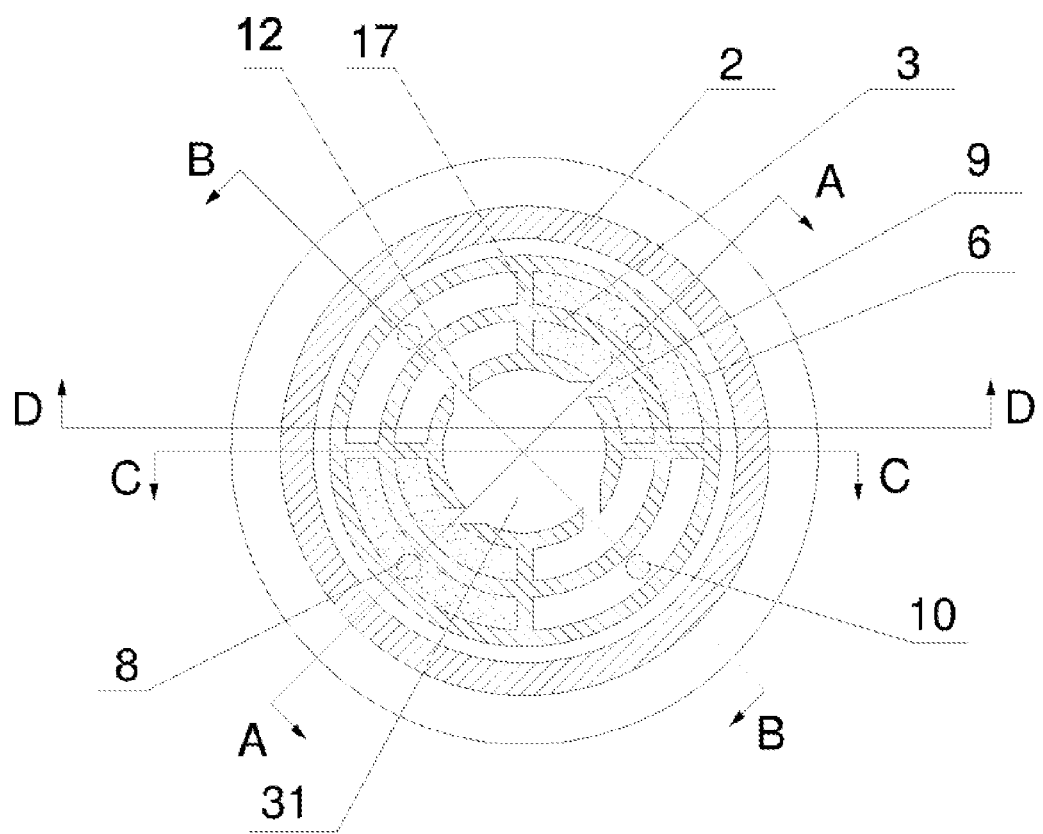
FIG. 2 is a schematic sectional view in a direction E-E in FIG. 1.
Figure 3:
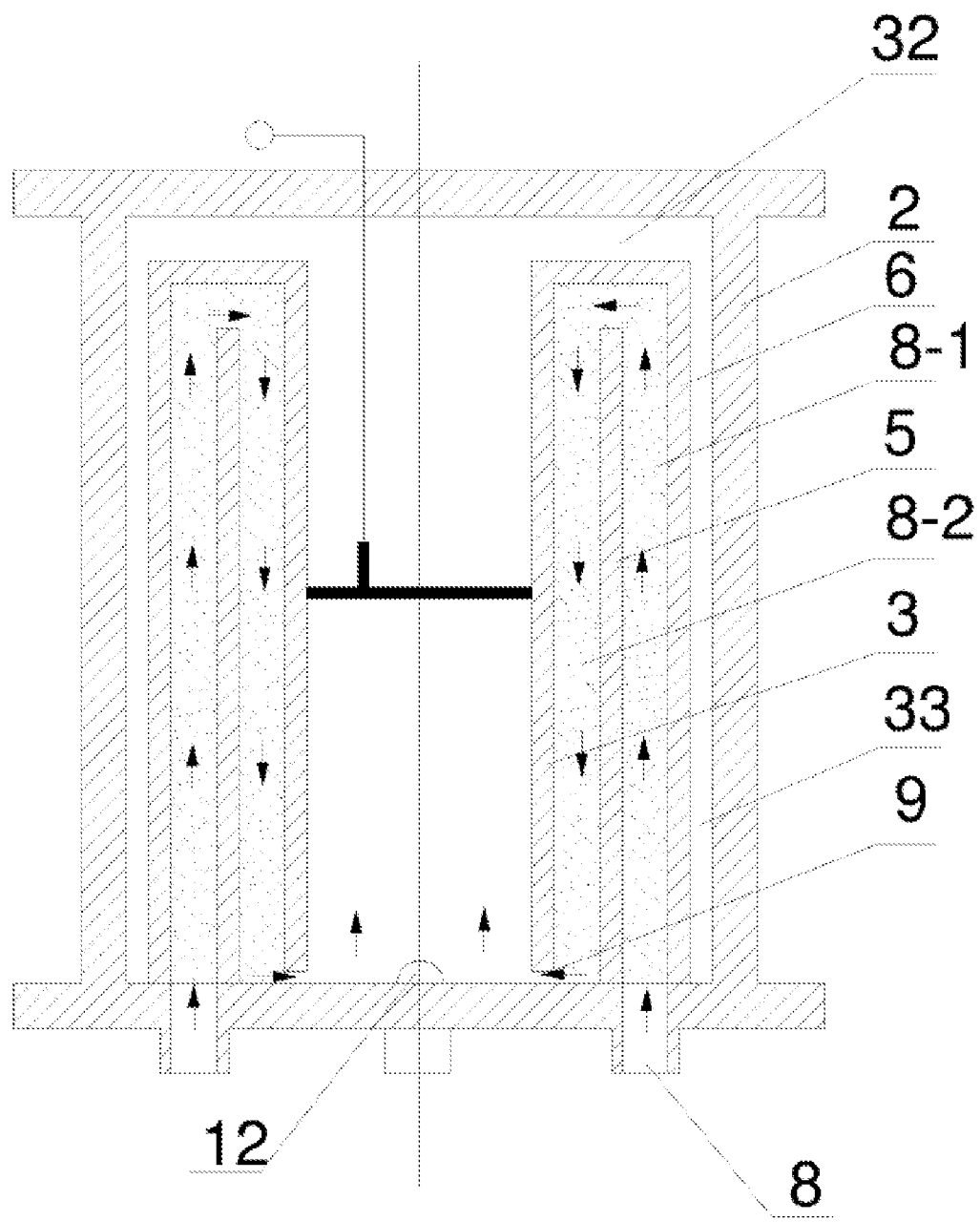
FIG. 3 is a schematic sectional view in a direction A-A in FIG. 2.
Figure 4:
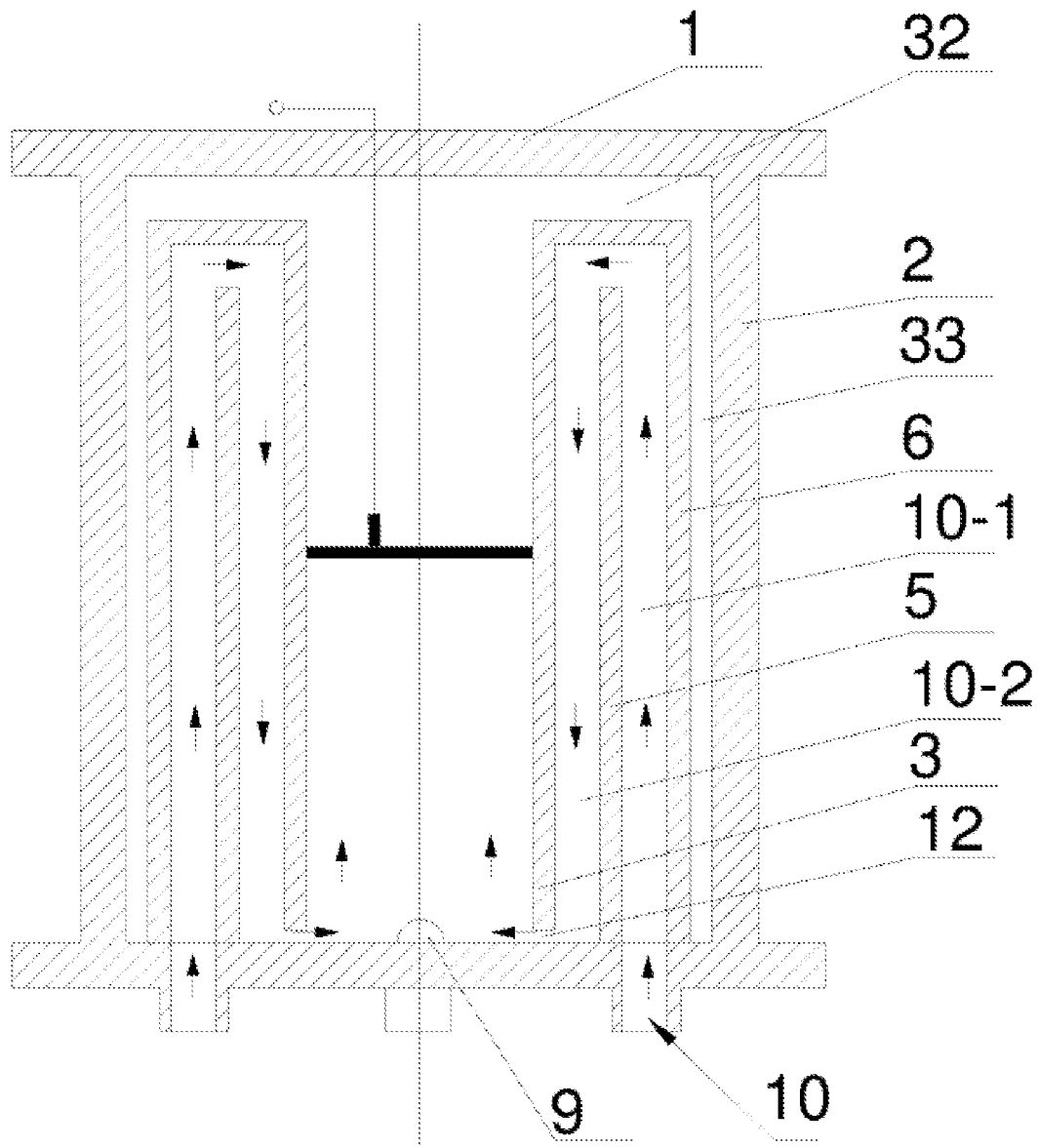
FIG. 4 is a schematic sectional view in a direction B-B in FIG. 2.
Figure 5:
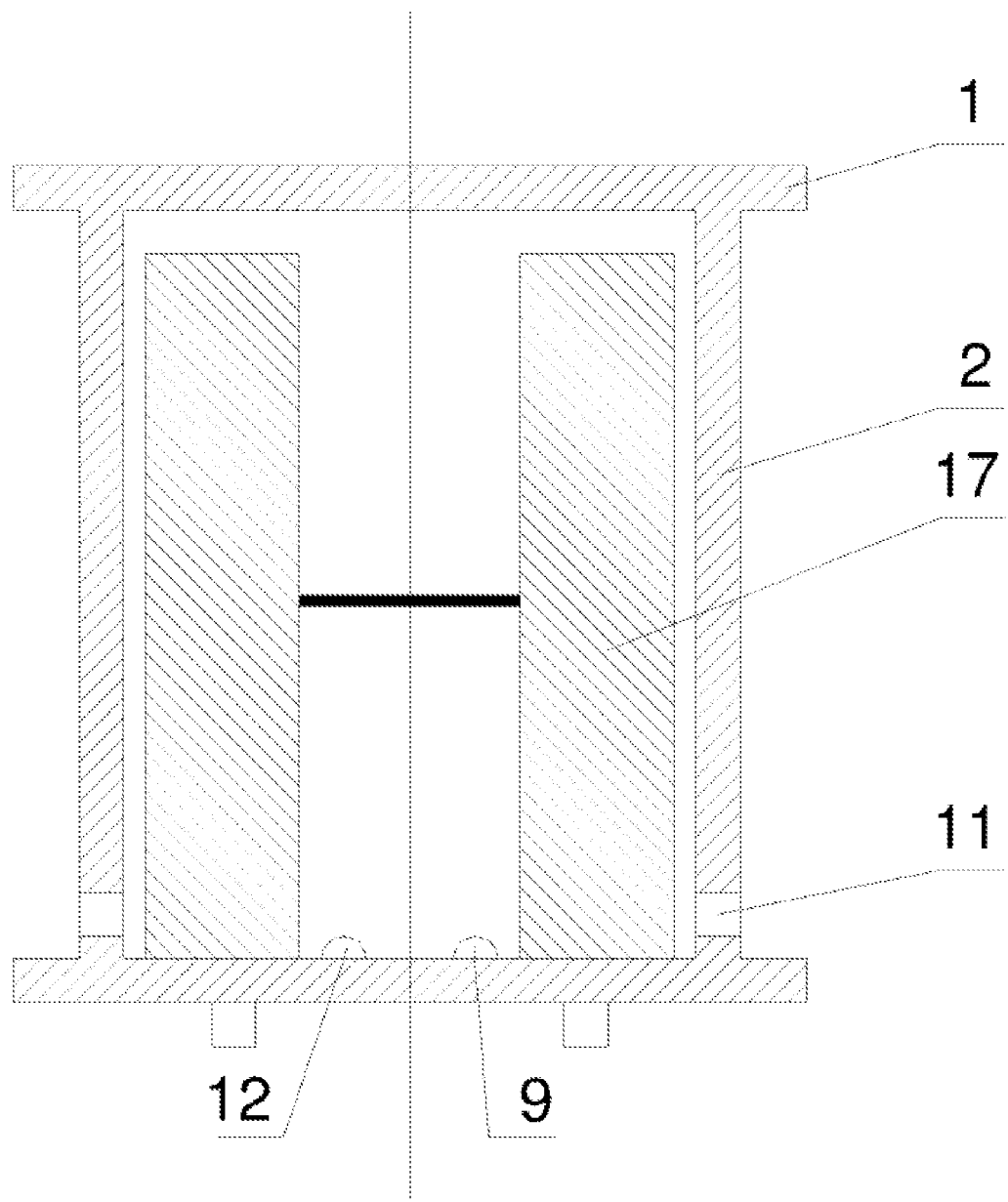
FIG. 5 is a schematic sectional view in a direction C-C in FIG. 2.

As shown in FIG. 1 to FIG. 5, the present disclosure discloses a miniature liquid combustor having a double pre-heating structure, comprising a combustor outer drum body 2, an upper sealing plate 1 used to seal an upper end of the combustor outer drum body 2, and a lower sealing plate 7 used to seal a lower end of the combustor outer drum body, a main vent hole 11 being opened on a sidewall of the lower end of the combustor outer drum body 2.

A first sleeve 6, a second sleeve 5, and a third sleeve 3 are sequentially comprised inside the combustor outer drum body 2 from outside to inside, lower ends of the first sleeve 6, the second sleeve 5, and the third sleeve 3 are all sealed by the lower sealing plate 7, upper ends of the first sleeve 6 and the third sleeve 3 are both sealed by using a sealing top lid 15, and a gap is provided between an outer surface of the sealing top lid 15 and an inner surface of the upper sealing plate 1, and a gap is provided between a top end of the second sleeve 5 and an inner surface of the sealing top lid 15, and the third sleeve 3 and the first sleeve 6 have a height of 31 mm and a thickness of 1 mm. The sealing top lid 15 has a thickness of about 1 mm.

Four partition plates 17 that radially penetrate a sleeve wall of the second sleeve 5 are further disposed on the sleeve wall of the second sleeve, an inner side of each of the partition plates 17 is connected to an inner wall of the third sleeve 3, an outer side of each of the partition plate is connected to an inner wall of the first sleeve 6, an upper side of each of the partition plate is connected to the sealing top lid 15, and a lower side of each of the partition plate is connected to the lower sealing plate 7, and the four partition plates 17 divide the space between the first sleeve 6, the second sleeve 5, and the third sleeve 3 into two opposite and independent air pre-heating chambers and two opposite and independent fuel pre-heating chambers. By using this structure, air and a fuel are pre-heated twice in counter-flow before entering a combustion chamber 31, so that the heat exchange intensity is greatly increased, and the air and fuel are thoroughly pre-heated before combustion. Therefore, not only thorough evaporation of a liquid fuel is facilitated to ensure more thorough and stable combustion, but also common defects such as unstable combustion, easy extinguishment, and low combustion efficiency of miniature-structure combustors are greatly mitigated. The benefits of partition plates 17 further lie in that this miniature liquid combustor has a more compact and scientific structure.

Each of the air pre-heating chambers is divided into a first air pre-heating chamber 10-1 and a second air pre-heating chamber 10-2 with the sleeve wall of the second sleeve 5 as a boundary. The first air pre-heating chamber 10-1 and the second air pre-heating chamber 10-2 are connected through the gap (2 mm to 3 mm) between the top end of the second sleeve 5 and the inner surface of the sealing top lid 15.

Each of the fuel pre-heating chambers is divided into a first fuel pre-heating chamber 8-1 and a second fuel pre-heating chamber 8-2 with the sleeve wall of the second sleeve 5 as a boundary. The first fuel pre-heating chamber 8-1 and the second fuel pre-heating chamber 8-2 are connected through the gap (2 mm to 3 mm) between the top end of the second sleeve 5 and the inner surface of the sealing top lid 15.

Space in an inner wall surface of the third sleeve 3 is a combustion chamber 31, and space between an outer wall surface of the first sleeve 6 and an inner wall surface of the combustor outer drum body 2 is a vent channel 33, and the combustion chamber 31 and the vent channel 33 are connected through a top-layer loop channel 32 between the outer surface of the sealing top lid 15 and the inner surface of the upper sealing plate 1.

One combustion-chamber air-inlet port 12 is opened respectively, corresponding to the second air pre-heating chambers 10-2 of the two air pre-heating chambers, on a bottom peripheral wall of the third sleeve 3. One combustion-chamber fuel-inlet port 9 is opened respectively, corresponding to the second fuel pre-heating chambers 8-2 of the two fuel pre-heating chambers, on the bottom peripheral wall of the third sleeve 3.

One air inlet hole 10 is respectively opened (the diameter being about 1 mm to 2 mm) corresponding to the first air pre-heating chambers 10-1 of the two air pre-heating chambers, on the lower sealing plate 7. One fuel inlet hole 8 (the diameter being about 1 mm to 2 mm) is respectively opened, corresponding to the first fuel pre-heating chambers 8-1 of the two fuel pre-heating chambers, on the lower sealing plate 7.

Air sequentially passes through the first air pre-heating chambers 10-1, the second air pre-heating chambers 10-2, and the combustion-chamber air-inlet ports 12 from the air inlet holes 10 to enter the combustion chamber 31, meanwhile, a fuel sequentially passes through the first fuel pre-heating chambers 8-1, the second fuel pre-heating chambers 8-2, and the combustion-chamber fuel-inlet ports 9 from the fuel inlet holes 8 to enter the combustion chamber 31 and is mixed with the air for combustion, and waste gas after combustion passes through the top-layer loop channel 32 and the vent channel 33 to be eventually discharged outside the combustor outer drum body 2 from the main vent hole 11.

The air passes through the air inlet holes 10 to enter the first air pre-heating chambers 10-1 from bottom to top, enter the second air pre-heating chambers 10-2 from top to bottom, enter the combustion chamber 31 from bottom to top, and enter the vent channel 33 from top to bottom, and the fuel enters the first fuel pre-heating chambers 8-1 from bottom to top from the fuel inlet holes 8, enters the second fuel pre-heating chambers 8-2 from top to bottom, enters the combustion chamber 31 from bottom to top, and enters the vent channel 33 from top to bottom.

The combustion-chamber air-inlet ports 12 and the combustion-chamber fuel-inlet ports 9 are both opened in a tangential direction on the same peripheral line of the bottom peripheral wall of the third sleeve 3, and the air and fuel enter the combustion chamber 31 in a tangential manner, are mixed in the combustion chamber 31, and rise spirally. By using the tangential arrangement, the fuel and air form a vortex during mixing, so that the fuel and air are mixed more uniformly in the combustion chamber 31. The diameters of the combustion-chamber air-inlet ports 12 and the combustion-chamber fuel-inlet ports 9 are from about 1 mm to 2 mm.

Positions at which the combustion-chamber air-inlet ports 12 and the air inlet holes 10 are opened are located on one diameter line. Positions at which the combustion-chamber fuel-inlet ports 9 and the fuel inlet holes 8 are opened are located on another diameter line, and the two diameter lines intersect each other (potentially, are perpendicular to each other). Diameters of the air inlet holes 10 and the fuel inlet holes 8 are less than a gap between the second sleeve 5 and the first sleeve 6.

The first fuel pre-heating chambers 8-1 and the second fuel pre-heating chambers 8-2 of the fuel pre-heating chambers are filled with sintered porous material. Under the common effect of high temperature and the porous material, the liquid fuel is further crushed into tinier liquid drops (or fog drops), so that the liquid fuel evaporates more rapidly as the temperature of the liquid fuel gradually rises, thereby making the combustion of the liquid fuel more thorough, stable, and efficient. The porous material is sintered material that has particular air permeability and excellent performance. In the present disclosure, SiC sintered material may be used. The air permeability of the SiC sintered material is 37%, and has an effect of crushing liquid drops to promote evaporation of the liquid fuel.

A metal catalyst grid 13 is disposed in the middle (slightly lower) of the combustion chamber 31. An igniter 14 is placed laterally above the metal catalyst grid 13. A lead 16 of the igniter 14 passes through the upper sealing plate 1 to be connected to an external high-voltage power source. A Cu—Ni, Pt—Ni or Pt—Cu catalyst is coated on the surface of the metal catalyst grid 13.

The metal catalyst grid 13 has a thickness of 0.5 mm, a diameter of 10 mm, and a grid density of 120 hole/cm$^2$. The catalyst grid can keep combustion flames stable and accelerate chemical reactions.

The upper sealing plate 1 and the lower sealing plate 7 are both circular, are made of a ceramic material having a low heat conduction coefficient and high temperature resistance, and have a diameter of 36 mm and a thickness of 2 mm. A hole having a diameter of 1 mm is opened on the upper sealing plate for the lead 16 of the igniter 14 to pass through.

A combustion method of the miniature liquid combustor may be implemented by using the following steps:

A liquid hydrocarbon fuel and air are introduced into the combustion chamber 31 and are ignited by the igniter 14 to combust stably above the metal catalyst grid 13, combustion flames first heat the third sleeve 3, and the heated third sleeve 3 gradually radiates thermal energy to the first fuel pre-heating chambers 8-1, the second fuel pre-heating chambers 8-2, the first air pre-heating chambers 10-1, and the second air pre-heating chambers 10-2, until the entire miniature liquid combustor is heated, and the air that enters the air pre-heating chambers and the fuel that enters the fuel pre-heating chambers are continuously pre-heated twice respectively before entering the combustion chamber 31.

A process of the double pre-heating may be as follows:

The liquid hydrocarbon fuel enters the first fuel pre-heating chambers 8-1 from bottom to top from the fuel inlet holes 8 to be heated for the first time, and is crushed for the first time under a crushing effect of the porous material in the first fuel pre-heating chambers 8-1 to form heated liquid drops, and next, the liquid hydrocarbon fuel enters the second fuel pre-heating chambers 8-2 from top to bottom to be heated for the second time, the porous material in the second fuel pre-heating chambers 8-2 heats and crushes for the second time the liquid drops that have been heated and crushed at the first time, to further reduce particle sizes of the heated liquid drops and form fuel vapour, and subsequently the liquid hydrocarbon fuel passes through the combustion-chamber fuel-inlet ports 9 to enter the combustion chamber 31 from bottom to top in a tangential manner.

Air also passes through the air inlet holes 10 to enter the first air pre-heating chambers 10-1 from bottom to top to be heated for the first time, enters the second air pre-heating chambers 10-2 from top to bottom to be heated for the second time, subsequently passes through the combustion-chamber air-inlet ports 12 to enter the combustion chamber 31 in a tangential manner, and is thoroughly mixed with the fuel vapour below the metal catalyst grid 13, to form a gas-liquid mixture, so as to complete double pre-heating and mixing of the liquid hydrocarbon fuel and the air, and next, the mixture rises spirally in a vortex, passes through the metal catalyst grid 13, and combusts stably above the metal catalyst grid, and waste gas after combustion passes through the top-layer loop channel 32 and the vent channel 33 to be eventually discharged outside the combustor outer drum body 2 from the main vent hole 11.

The implementation manners of the present disclosure are not limited to the foregoing embodiments. Any other changes, modifications, replacements, combinations, and simplifications made without departing from the spirit, essence, and principles of the present disclosure should be equivalent alternatives and shall fall within the protection scope of the present disclosure.

The invention claimed is:

1. A miniature liquid combustor comprising:
a double pre-heating structure, including a combustor outer drum body, an upper sealing plate used to seal an upper end of a combustor outer drum body, and a lower sealing plate used to seal a lower end of the combustor outer drum body, and a main vent hole opened on a sidewall of the lower end of the combustor outer drum body, wherein
a first sleeve, a second sleeve, and a third sleeve are sequentially comprised inside the combustor outer drum body, lower ends of the first sleeve, the second sleeve, and the third sleeve are all sealed by a lower sealing plate, upper ends of the first sleeve and the third sleeve are both sealed by using a sealing top lid, and a gap is provided between an outer surface of the sealing top lid and an inner surface of the upper sealing plate, another gap is provided between a top end of the second sleeve and an inner surface of the sealing top lid;
four partition plates that radially penetrate a sleeve wall of the second sleeve are further disposed on the sleeve wall of the second sleeve, an inner side of each partition plate is connected to an inner wall of the third sleeve, an outer side of the partition plate is connected to an inner wall of the first sleeve, an upper side of each partition plate is connected to a sealing top lid, and a lower side of each partition plate is connected to the lower sealing plate, the four partition plates divide a space between the first sleeve, the second sleeve, and the third sleeve into two opposite and independent air pre-heating chambers and two opposite and independent fuel pre-heating chambers;
wherein each of the air pre-heating chambers is divided into a first air pre-heating chamber and a second air pre-heating chamber with a sleeve wall of the second sleeve as a boundary, and a first air pre-heating chamber and a second air pre-heating chamber are connected through a gap between the top end of the second sleeve and an inner surface of the sealing top lid;
wherein each of the fuel pre-heating chambers may be divided into a first fuel pre-heating chamber and a second fuel pre-heating chamber with the sleeve wall of the second sleeve as a boundary, and the first fuel pre-heating chamber and the second fuel pre-heating chamber may be connected through the gap between the top end of the second sleeve and an inner surface of the sealing top lid;
wherein a space in an inner wall surface of the third sleeve includes a combustion chamber, and space between an outer wall surface of the first sleeve and an inner wall surface of the combustor outer drum body includes a vent channel, and the combustion chamber and the vent channel are connected through a top-layer loop channel between the outer surface of the sealing top lid and an inner surface of an upper sealing plate;
wherein one combustion-chamber air-inlet port is provided and can be opened respectively, corresponding to the second air pre-heating chambers of the two air pre-heating chambers, on a bottom peripheral wall of the third sleeve, and one combustion-chamber fuel-inlet port is opened respectively, corresponding to the second fuel pre-heating chambers of the two fuel pre-heating chambers on the bottom peripheral wall of the third sleeve;
wherein one air inlet hole is respectively opened corresponding to the first air pre-heating chambers of the two air pre-heating chambers, on the lower sealing plate, one fuel inlet hole is respectively opened, corresponding to the first fuel pre-heating chambers of the two fuel pre-heating chambers, on the lower sealing plate; and
wherein air sequentially passes through the first air pre-heating chambers, the second air pre-heating chambers, and the combustion-chamber air-inlet ports from the air inlet holes to enter the combustion chamber, and a fuel sequentially passes through the first fuel pre-heating chambers, the second fuel pre-heating chambers, and the combustion-chamber fuel-inlet ports from fuel inlet holes to enter the combustion chamber and is mixed with air for combustion, and waste gas after combustion passes through the top-layer loop channel and the vent channel to be eventually discharged outside the combustor outer drum body from the main vent hole.

2. The miniature liquid combustor as claimed in claim 1, wherein the air passes through the air inlet holes to enter the first air pre-heating chambers from bottom to top, enters the second air pre-heating chambers from top to bottom, enters the combustion chamber from bottom to top, and enters the vent channel from top to bottom; and the fuel enters the first fuel pre-heating chambers from bottom to top from the fuel inlet holes, enters the second fuel pre-heating chambers from top to bottom, enters the combustion chamber from bottom to top, and enters the vent channel from top to bottom.

3. The miniature liquid combustor as claimed in claim 2, wherein the combustion-chamber air-inlet ports and the combustion-chamber fuel-inlet ports are both opened in a tangential direction on a same peripheral line of a bottom peripheral wall of the third sleeve, and the air and fuel enter the combustion chamber in a tangential manner, being mixed in the combustion chamber.

4. The miniature liquid combustor as claimed in claim 2, wherein positions at which the combustion-chamber air-inlet ports and the air inlet holes are located on one diameter line positions at which the combustion-chamber fuel-inlet ports and the fuel inlet holes are opened are located on another diameter line, and the two diameter lines intersect each other.

5. The miniature liquid combustor as claimed in claim 1, wherein diameters of the air inlet holes and the fuel inlet holes are less than a gap between the second sleeve and first sleeve.

6. The miniature liquid combustor as claimed in claim 1, wherein the first fuel pre-heating chambers and the second fuel pre-heating chambers of the fuel pre-heating chambers are filled with sintered porous material.

7. The miniature liquid combustor as claimed in claim 1, wherein a metal catalyst grid is disposed in a middle of the combustion chamber, an igniter is placed laterally above the metal catalyst grid, and a lead of the igniter passes through the upper sealing plate to be connected to an external high-voltage power source, and a Cu—NI, Pt—Ni or Pt—Cu catalyst is coated on the surface of the metal catalyst grid.

8. A method comprising the following steps:
providing a miniature liquid combustor according to claim 1;
introducing a liquid hydrocarbon fuel and air introduced into the combustion chamber and are ignited by an igniter to combust stably above a metal catalyst grid, combustion flames first heat the third sleeve, and the heated third sleeve gradually radiates thermal energy to the first fuel pre-heating chamber, the second fuel pre-heating chamber, the first air pre-heating chamber, and the second air pre-heating chamber, until the entire miniature liquid combustor is heated; and
the air that enters the air pre-heating chambers and the fuel that enters the fuel pre-heating chambers are continuously pre-heated twice respectively before entering the combustion chamber.

9. The combustion method as claimed in claim 8, wherein a process of the double pre-heating includes:
the liquid hydrocarbon fuel enters a first fuel pre-heating chambers from bottom to top from the fuel inlet holes to be heated for the first time, and is crushed for a first time under a crushing effect of the porous material in the first fuel pre-heating chambers to form heated liquid drops;
liquid hydrocarbon fuel enters a second fuel pre-heating chamber from top to bottom to be heated for the second time, the porous material in the second fuel pre-heating chamber heats and crushes for the second time the liquid drops that have been heated and crushed at the first time, to further reduce particle sizes of the heated liquid drops and form fuel vapour, and subsequently the liquid hydrocarbon fuel passes through the combustion-chamber fuel-inlet port to enter the combustion chamber from bottom to top in a tangential manner;
air passes through the air inlet holes to enter the first air pre-heating chambers from bottom to top to be heated for the first time;
air enters the second air pre-heating chambers from top to bottom to be heated for the second time, subsequently passes through the combustion-chamber air-inlet ports to enter the combustion chamber in a tangential manner, and is mixed with the fuel vapour below a metal catalyst grid, to form a gas-liquid mixture, so as to complete double pre-heating and mixing of the liquid hydrocarbon fuel and the air; and
the gas liquid mixture rises spirally in a vortex, passes through the metal catalyst grid, and combusts stably above the metal catalyst grid, and waste gas after combustion passes through the top-layer loop channel and the vent channel to be eventually discharged outside a combustor outer drum body from a main vent hole.

10. A miniature liquid combustor comprising:
a double pre-heating structure, including a combustor outer drum body, an upper sealing plate used to seal an upper end of a combustor outer drum body, and a lower sealing plate used to seal a lower end of the combustor outer drum body, and a main vent hole opened on a sidewall of the lower end of the combustor outer drum body, wherein
a first sleeve, a second sleeve, and a third sleeve are sequentially comprised inside the combustor outer drum body, lower ends of the first sleeve, the second sleeve, and the third sleeve are all sealed by a lower sealing plate, upper ends of the first sleeve and the third sleeve are both sealed by using a sealing top lid, and a gap is provided between an outer surface of the sealing top lid and an inner surface of the upper sealing plate, another gap is provided between a top end of the second sleeve and an inner surface of the sealing top lid;
four partition plates that radially penetrate a sleeve wall of the second sleeve are further disposed on the sleeve wall of the second sleeve, an inner side of each partition plate is connected to an inner wall of the third sleeve, an outer side of the partition plate is connected to an inner wall of the first sleeve, an upper side of each partition plate is connected to a sealing top lid, and a lower side of each partition plate is connected to the lower sealing plate, the four partition plates divide a space between the first sleeve, the second sleeve, and the third sleeve into two opposite and independent air pre-heating chambers and two opposite and independent fuel pre-heating chambers;
wherein a metal catalyst grid is disposed in a middle of the combustion chamber, an igniter is placed laterally above the metal catalyst grid, and a lead of the igniter passes through the upper sealing plate to be connected to an external high-voltage power source, and a Cu—NI, Pt—Ni or Pt—Cu catalyst is coated on the surface of the metal catalyst grid.

* * * * *